United States Patent [19]

Lee et al.

[11] 4,434,138

[45] Feb. 28, 1984

[54] ION EXCHANGE RESINS FOR URANIUM RECOVERY

[75] Inventors: John M. Lee; William C. Bauman, both of Lake Jackson, Tex.

[73] Assignee: The Dow Chemical Company, Midland, Mich.

[21] Appl. No.: 307,825

[22] Filed: Oct. 2, 1981

[51] Int. Cl.³ .................. C01G 43/00; B01J 39/20; B01J 41/14
[52] U.S. Cl. .................................. 423/7; 521/28
[58] Field of Search .............. 521/28; 75/101 BE; 423/7

[56] References Cited

U.S. PATENT DOCUMENTS

| | | | |
|---|---|---|---|
| 3,041,292 | 6/1962 | Hatch | 521/28 |
| 3,346,422 | 10/1967 | Berger | 521/32 |
| 3,352,800 | 11/1967 | Smith et al. | 521/28 |
| 3,995,009 | 11/1976 | Notz | 423/7 |
| 4,185,077 | 10/1975 | Albright | 423/7 |

*Primary Examiner*—Joseph L. Schofer
*Assistant Examiner*—Peter F. Kulkosky
*Attorney, Agent, or Firm*—W. J. Lee

[57] ABSTRACT

The density and capacity of macroporous ion exchange resins are increased by incorporating therein at least one of titania hydrate, zirconia hydrate, hydrated titanium phosphorous, and hydrated zirconium phosphate hydrates. Such resin composites are useful, e.g., in removing uranium values from aqueous solutions.

15 Claims, No Drawings

ION EXCHANGE RESINS FOR URANIUM RECOVERY

BACKGROUND OF THE INVENTION

It is known in the uranium recovery industry that anion exchange resins may be used to gather and concentrate uranium values from aqueous solutions. The production rates are limited by the amount of uranium loading per unit of resin and the rate of flow of crude liquors as a function of density.

In accordance with the presently disclosed invention improvements are made, relative to both problems. By increasing the density of the resin one can increase the flow without a concomitant increase in resin loss by entrainment because the expansion of the resin bed is less. By adding exchange sites one is able to increase the relative loading.

SUMMARY OF THE INVENTION

Weak or strong base macroporous anion exchange resins and weak or strong acid macroporous cation exchange resins are loaded with at least one hydrate selected from the group comprising titania hydrate, zirconia hydrate, hydrated titanium phosphate, and hydrated zirconium phosphate and the so-formed composites are useful in selectively removing uranium values from solutions. This increases the density and the capacity of the resins, both increases being beneficial.

DETAILED DESCRIPTION OF THE INVENTION

For use in the resin composites of the present invention, either anionic or cationic macroporous exchange resins may be used.

The anion exchange resins for use in the present invention are water-insoluble (though they may be somewhat water-swellable) macroporous beads comprising organic polymers having ionizable base groups (e.g., amines) attached to the polymer chains. Conveniently and preferably the polymers are crosslinked copolymers of styrene, especially crosslinked copolymers of styrene/divinylbenzene with the base groups attached to the aromatic rings of the polymer chain. Such anion exchange resins are commercially available, e.g., from The Dow Chemical Company under the tradename "DOWEX" and from Rohm and Haas Company under the tradename "AMBERLYST".

The cation exchange resins preferred for use in the present invention are quite similar in structure to the exchange resins described above, except that instead of base groups the cation exchange resins have ionizable pendent acid groups. Such resins are commercially available from, e.g., the sources given above.

The anion and cation resins may be obtained in their neutral salt forms, the base groups may be, e.g., in their $Cl^-$ or $OH^-$ forms and the acid groups may be, e.g., in their $H^+$ or $Na^+$ forms.

Generally, the resin composites in accordance with the present invention are prepared by incorporating one or more soluble compounds of titanium and/or zirconium, then adding an alkalizing agent to cause precipitation of such titanium and/or zirconium values as oxide hydrates. Initially, solubility of the titanium and/or zirconium compounds may be helped, if needed, by having the aqueous solution in the acid range, e.g., aqueous HCl. The titania hydrate and zirconia hydrate are, optionally, converted to hydrated titanium phosphate and hydrated zirconium phosphate by reaction with soluble phosphate values.

Macroporous anion and cation exchange resins have been loaded with titania hydrate, zirconia hydrate, hydrated titanium phosphate, and hydrated zirconium-phosphate. All have been shown to have utility in selectively removing uranium from weak solutions. The extra weighting introduced by the insoluble inorganic portions allows up to twice the volume flow in upflow applications without loss of the resin bed. In addition, the titania hydrate loaded resins also had higher potential loading. These resins have been tested on both the carbonate-high pH circuits and the sulfate-low pH circuits.

The soluble Ti compound for inclusion in the ion exchange resin beads may be any Ti compound which will form titania hydrate when alkalized to an alkaline pH. For example, soluble titanyl halides incorporated into the resin beads will precipitate as a titania hydrate in-situ when alkalized with ammonia. Other Ti compounds which will perform in substantially the same manner are, e.g., $H_2TiF_6$, $Li_2TiF_6$, $H_2TiCl_6$, $(NH_4)_2TiBr_6$, and the like.

Intrusion of $TiOCl_2$ solution into both DOWEX MSA-1 and MSC-1 was successfully followed by precipitation of active titanium oxide hydrate. This resin has shown excellent selectivity for uranium. The indicated loading is almost twice that for standard anion resins. Acid regeneration is not practical because of Ti loss, but the carbonate cycle now being used in many mines would be suitable. The high density of the resin would permit much faster upflow in current operations.

The soluble Zr compound for inclusion in the resin beads may be any Zr compound which will form zirconia hydrate when alkalized. For example, zirconyl halides incorporated into the resin beads will precipitate as zirconia hydrate in-situ when alkalized with ammonia. Other Zr compounds which will perform in substantially the same manner are, e.g., $ZrOCl_2.xH_2O$, $Zr(NO_3)_4.5H_2O$, $ZrOBr_2.xH_2O$, $ZrOI_2.8H_2O$, $Zr(SO_4)_2.4H_2O$ and the like.

For the present invention it is preferred that the alkalizer be ammonia since it, and its reaction products, are more efficiently washed out than the alkali metal hydroxides, the alkaline earth metal hydroxides, or the organic amines.

The precipitation of the desired metal hydrates within the resin beads may be cold (e.g., ambient temperature) or hot (e.g., 100° C. or more), but it is usually preferred that a temperature in the range of about 25° to about 60° C. be used.

The composite resin beads containing the zirconia hydrate and/or titania hydrate is beneficially treated with a soluble phosphate, preferably $H_3PO_4$ and/or $Na_2HPO_4$ to form, e.g., hydrated $Zr(HPO_4)_2$ or hydrated $Ti(HPO_4)$ which are quite resistant to acid attack and appreciably extends the pH range to which the resin composite may be subjected without appreciable or substantial loss of the Zr and/or Ti compounds. Such phosphate treatment may be performed in the temperature range of about 25° C. to about 100° C. for a period of time ranging from about 60 minutes to 16 hours or more. Preferably the phosphate is a concentrated solution. Heating of the Zr-phosphate or Ti-phosphate is found to crystallize it to the alpha form, thereby optimizing its resistance to acid attack at very low pH's.

Removal of uranium values from solutions is performed by passing the solution through a bed of the present resin composite until the resin composite is substantially loaded to its capacity with uranium. Then the uranium can be stripped from the resin using an aqueous $Na_2CO_3$ and/or NaCl wash and the resin composite reloaded by passing uranium solution through it again.

INCORPORATION OF ZIRCONIA HYDRATE AND HYDRATED ZIRCONIUM PHOSPHATE INTO RESIN

In a generalized embodiment, the polymeric zirconium hydrous oxide is formed within the resin beads by wetting the resin with an aqueous solution of a soluble zirconium or zirconyl compound, such as $ZrOCl_2.8\text{-}H_2O$ and then alkalized. If excessive zirconium or zirconyl solution is present, it should be drained off and the resin substantially dried, such as by air-drying. The dried resin, containing the zirconium or zirconyl compound is alkalized or neutralized, preferably by use of $NH_4OH$, thereby forming polymeric $ZrO(OH)_2$. Excess $NH_4OH$ and $NH_4Cl$ (which forms) is washed out, such as by repeated contact with water or NaCl brine.

Since the zirconia hydrate could be slowly leached out at 2 pH and lower, a further modification is necessary for use in lower pH ranges. Treatment with, e.g., $H_3PO_4$ and/or $NaH_2PO_4$ for several hours converts, at least partially, the polymeric $ZrO(OH)_2$ to polymeric $ZrO(H_2PO_4)_2$ which is more resistant to acid attack. Further heating with $H_3PO_4$ and/or $NaH_2PO_4$ produces crystalline $ZrO(H_2PO_4)_2$ which is even more resistant to acid.

In the general process outlined above, the beginning zirconium compound may be $ZrOCl_2.xH_2O$ or the like, such as $Zr(NO_3)_4.5H_2O$, $ZrOBr_2.xH_2O$, $ZrOI_2.8H_2O$, or $Zr(SO_4)_2.4H_2O$, or any such zirconium compound which will precipitate to form $Zr(OH)_4$ or $ZrO(OH)_2$ when contacted with a base, especially $NH_4OH$. The so-formed $Zr(OH)_4$ or $ZrO(OH)_2$, also called "hydrous zirconium oxide", is an amorphous, polymeric structure. Following the above alkalizing step, the $PO_4^{---}$ used for forming the $ZrO(H_2PO_4)_2$ is preferably $H_3PO_4$, but may also be $Na_2HPO_4$, $NaH_2PO_4$, $K_2HPO_4$, $KH_2PO_4$ $NH_4H_2PO_4$, $(NH_4)_2HPO_4$, and the like.

Once the $ZrO(H_2PO_4)_2$ has been formed, the composite is ready to take on uranium values from solution. This is done, for example, by placing the composite in a vessel, preferably a column, and passing uranium-containing solution through the composite until the composite is substantially "loaded" with uranium values and is ready for regeneration. Multiple loadings and regenerations may be performed, using the same bed of resin composite.

It is preferred that maximum loading of the hydrous oxide into the resin be attained, or at least approached. The upper limits are those imposed by the amount of zirconium compound which the resin can imbibe; likewise for the phosphorous to zirconium ratio. It should be noted that macroporous resin is expected to imbibe much more of the zirconium and phosphorous compounds than a gel-type resin.

Using commercially available macroporous resin, a resin composite containing about 1.47 moles of Zr/cc is readily obtained as per Example 1 which follows; a phosphorous/zirconium ratio of 0.297 in this resin is obtained and is operable.

A flow rate of about 0.01–0.08 bed volume ($V_B$) per minute at about 50°–60° C. is preferred for the uranium solution, though flow rates in the range of 0.001 to 0.2 bed volumes per minute at temperatures from about 20°–100° C. are operable.

By use of the present invention, greater than 99% of the uranium may be removed from 15 bed volumes of solution containing about 500 mg uranium per liter.

INCORPORATION OF TITANIA HYDRATE AND HYDRATED TITANIUM PHOSPHATE INTO RESIN

One convenient source for soluble Ti compounds is $TiCl_4$, but because of its handling problems and its tendency to form insoluble oxides in air or in neutral water, it is best to use, as a first step, a careful reaction with a mineral acid (e.g., HCl) with the $TiCl_4$ to produce a solution of titanyl salt (e.g., $TiOCl_x$). For instance a solution of $TiCl_4$ in carbon tetrachloride may be mixed with aqueous HCl; the aqueous phase, which carries the so-formed $TiOCl_x$, phases-out from the $CCl_4$ phase and is easily separated in a separatory funnel.

In a generalized embodiment the titania hydrate is formed within the resin particles by wetting the resin with an aqueous solution of a soluble titanium compound or titanyl compound, e.g., $TiOCl_x.xH_2O$, and then alkalizing. If excess titanium compound is present it should be drained off and the resin dried, such as by air-drying. The dried resin containing the titanium compound is alkalized, preferably by use of $NH_4OH$, thereby forming insoluble titania hydrate. Excess $NH_4OH$ and ammonium salt (which forms) is washed out, such as with water or NaCl brine. When desired, the composite is acidified with, e.g., $H_3PO_4$ thereby converting the titania hydrate to hydrated titanium phosphate which is more resistant to acid attack. Further heating with $H_3PO_4$ causes crystallization of $TiO(H_2PO_4)_2$ which is even more resistant to acid attack.

In the general process outlined above, the beginning titanium compound may be, for example, $TiOCl_2$, $TiCl_4$, $TiOSO_4$, and the like or any such soluble titanium compound which will precipitate as a titania hydrate when alkalized, such as with $NH_4OH$. The titania hydrate, also called "hydrous titanium oxide" is an amorphous structure. Following the above formation of precipitated titania hydrate, the phosphorous compound used in forming the hydrated titanium phosphate may be, e.g., $H_3PO_4$ or the like including $KH_2PO_4$, $NaH_2PO_4$, $Na_2HPO_4$, $K_2HPO_4$, $NH_4H_2PO_4$, $(NH_4)_2HPO_4$, and the like. The hydrated titanium phosphate may be represented, generally, by the empirical formula $TiO(H_2PO_4)_2$.

Once the titania hydrate or $TiO(H_2PO_4)_2$ has been formed, the composite is ready to take on uranium values from solution. This is done, for example, by placing the composite in a vessel, preferably a column, and passing uranium-containing solution through the composite until the composite is substantially "loaded" with uranium values and is ready for regeneration. Multiple loadings and regenerations may be performed, using the same bed of resin composite.

It is preferred that maximum loading of the titanium compound into the resin be attained, or at least approached. The upper limits are those imposed by the amount of titanium compound which the resin can imbibe; likewise for the phosphorous to titanium ratio. It should be noted that a macroporous resin is expected to imbibe more of the titanium and phosphorous compounds than a gel-type resin.

A flow rate of about 0.01-0.08 bed volume ($V_B$) per minute at about 50°-60° C. is preferred for the uranium solution, though flow rates in the range of 0.001 to 0.2 bed volumes per minute at temperatures from about 20°-100° C. are operable.

By use of the present invention, greater than 99% of the uranium may be removed from 15 bed volumes of solution containing about 500 mg uranium ions per liter.

The following examples are intended to illustrate embodiments of the present invention, but the invention is not limited to the particular embodiments shown.

EXAMPLE 1

Here, there is used a macroporous anion exchange resin with tertiary amine groups affixed to a styrene-divinylbenzene resin structure. The resin is in the amine chloride salt form and is a commercial resin sold by The Dow Chemical Company under the tradename of DOWEX MWA-1. About 34 gms of this resin is wetted with a solution of about 30 gms $ZrOCl_2.4H_2O$ in 40 gms $H_2O$. This resin absorbs all the solution and becomes free-flowing. The air-dried resin is added to a solution of 30 ml of 30% aqueous $NH_3$ and 10 ml $H_2O$. The temperature rises to about 40° C. The excess $NH_4OH$, external $Zr(OH)_4$, and the $NH_4Cl$ (which forms) are washed out by repeated contact with excess water. The washed resin is added to 40 gm. of conc. $H_3PO_4$ in 100 gm $H_2O$(pH=1.0), then added to 21 gm of $CaCl_2.2H_2O$ and neutralized with 30% $NH_3$ with warming. With 40 ml of 30% $NH_3$ added, the pH=7.0 at 70° C. The resin is then washed with raw brine (26% NaCl, 681 ppm $Ca^{++}$), the final pH is 6.7 in 26% NaCl by glass electrode. The product is 115 cc of resin composite. X-ray diffraction analysis revealed no crystallinity. The so-formed composite is useful in removing an appreciable amount of uranium values from a dilute solution containing dissolved uranium ions.

EXAMPLE 2

Intrusion of the selected soluble metal ion into various macroporous resins was followed by precipitation of the hydrous oxide within the resin by treatment with aqueous $NH_3$.

Depending upon the desired system DOWEX MSC-1, DOWEX MSA-1, and DOWEX MWA-1 have all been proven to have utility. In several cases a heating step has been beneficial. This is thought to improve crystal growth but X-ray examination does not always confirm such growth. Systems which are amorphous to X-ray are still operable.

Hydrous oxides of titanium or zirconium and the partial phosphate salts of these oxides were prepared in all the above three Dow macroporous resins. In a sample preparation, $TiCl_4$ (0.6669 moles) was dissolved in $CCl_4$ then slowly added to a concentrated HCl solution. The $CCl_4$ was removed via separatory funnel and the titanium oxychloride solution (132 cc) was gravity fed to 138 cc of 20-50 mesh DOWEX MSC-1 resin. Down flow of dry nitrogen eluted 235 cc of solution which by analysis showed a net 0.1395 g/cc Ti loading.

The resin after drying by continued $N_2$ flow was dumped into 150 cc of 30% $NH_3$ solution to precipitate the hydrous oxide.

Similar steps with $ZrOCl_2$ gave the corresponding resin. A secondary treatment with phosphate ions converted each hydrous oxide resin into the partial phosphate salts. These methods produced resins which were shown to have the desired higher density, stability for use in either the carbonate or acidic sulfate systems now applied in the uranium recovery industry and in addition, significantly higher loadings were found for the titanium resins in the carbonate cycles.

A comparative study of the effect of the higher densities may be shown graphically with percent bed expansion plotted as a function of flow rate per square foot of bed. This of course relates to potential productivity increases per unit of resin bed. Resins loaded to half breakthrough with synthetic feed containing 0.51 g. $U_3O_8$/liter upon elution gave peaks as high as 11 g/liter.

The data (which may be graphed, if desired, to show the relative slopes of curves) are given in tabular form in Table I below. In the table the "Resin Identity" is as follows:

MSA-1-Cl refers to a commercially available strong-base anion exchange resin in its chloride form sold under the tradename of DOWEX;

MWA-1-Cl is similar to MSA-1-Cl except that it is a weak-base resin;

MSA-1-Ti refers to MSA-1 into which a Ti hydrate has been incorporated according to this invention;

MWA-1-ZrP refers to the weak-base resin into which a zirconia hydrate, modified with phosphate, is incorporated;

MWA-1-TiP refers to the weak-base resin into which a titania hydrate, modified with phosphate, is incorporated.

The resins without the addition of the metal hydrates of the present invention are included in the table for comparison purposes.

TABLE I
PERCENT BED EXPANSION OF THE RESINS AT SELECTED FLOW RATES

| Resin Identity | Flow Rates in GPM/ft$^2$ | | | | | |
|---|---|---|---|---|---|---|
| | 2 | 4 | 6 | 8 | 10 | 12 |
| MSA-1-Cl | 60 | 120 | — | — | — | — |
| MWA-1-Cl | 38 | 75 | 115 | — | — | — |
| MSA-1-Ti | 20 | 38 | 57 | 77 | 95 | 115 |
| MWA-1-ZrP | 16 | 27 | 40 | 53 | 66 | 79 |
| MWA-1-TiP | 7 | 14 | 25 | 42 | 55 | 70 |

EXAMPLE 3

Using the weak base resin DOWEX MWA-1, about 300 cc of resin in chloride form was loaded in a column and the excess of 1.34 gravity $ZrOCl_2$ solution was passed through. When influent and effluent densities were approximately equal, the resin was dried in a stream of dry nitrogen to a free flowing state. The resin then was poured into 200 cc of 30% aqueous $NH_3$, stirred and then washed to remove the hydrous oxide which resulted from adhering liquor, and thus was not precipitated within the resin substrate. To further extend the useful pH range the resin thus prepared was then heated in 30-40% $H_3PO_4$ to crystallize the $\alpha$ form of $ZrO(H_2PO_4)_2$ within the resin. The zirconium phosphate so prepared is very resistant to acid attack and thus extends the usefulness of the resin to the very low pH ranges such as may be encountered in some of the acid cycles.

EXAMPLE 4

A column of 170 cc of DOWEX MSA-1 was treated with a solution of titanium (67.32 g of $TiCl_4$ in $CCl_4$ added to acidified water) and the effluent analyzed for Ti. The net load was 0.2527 moles Ti or 1.49 m moles/ml of resin. After being neutralized with concentrated aqueous NH₃ a test column of 117 cc was packed with this resin. A test solution of 470 ppm U was pumped through at 50° C. and at a rate of 22 cc/min.

After 18 liters through a test column no U was shown. The flow was continued and was as follows:

| | | |
|---|---|---|
| 18 liters | Zero U | |
| 21.1 liters | Zero U | |
| 22.5 liters | .012 mg U/cc | |
| 23.6 liters | .031 | |
| 24.33 liters | .056 | |
| 25.12 liters | .104 | |
| 25.83 liters | .108 | |
| 27.25 liters | .152 | |
| 28.41 liters | .360 | |

This data indicates one-half breakthrough at 27.5 liters. DOWEX MSA-1 not treated by our process when tested under the same conditions showed one-half breakthrough at 16.5 liters.

The loaded resin was stripped as follows: ambient temperature, 3.35 cc/min with 1 molar $Na_2CO_3$ for 8 samples, 50 cc each. Then the wash solution was changed to 30 g NaCl, 5 g $Na_2CO_3$ in 500 cc $H_2O$ for 11 more samples.

TABLE II

Elution of U from DOWEX MSA-1
$TiO_2$ - Hydrate Loaded

| Sample 50cc @ | Total $U_3O_8$ in Sample | ppm Ti |
|---|---|---|
| 1 | 160 mg | — |
| 2 | 360 mg | — |
| 3 | 1480 mg | 1.1 |
| 4 | 1000 mg | — |
| 5 | 760 mg | — |
| 6 | 570 mg | — |
| 7 | 470 mg | — |
| 8 | 440 mg | — |
| # | | |
| 9 | 550 mg | — |
| 10 | 490 mg | — |
| 11 | 875 mg | — |
| 12 | 2550 mg | — |
| 13 | 1687 mg | — |
| 14 | 1350 mg | — |
| 15 | 300 mg | — |
| 16 | 168 mg | — |
| 17 | — | — |

Change eluting solution from $Na_2CO_3$ to $Na_2CO_3$ plus NaCl.

EXAMPLE 5

A column of 138 cc of DOWEX MSC-1 20-50 mesh was treated as in Example 2 to obtain a total loading of 0.402 moles of Ti. After NH₄OH neutralization and water washing a column of 117 cc of the resin was tested with a synthetic solution of 36.1961 g $UO_2(C_2H_3O_2)_2 \cdot 2H_2O$ (uranyl acetate) in 2 liters which was pumped through until U was detected. The total loading was established as 34.178 gm of uranium.

EXAMPLE 6

A resin was prepared using DOWEX MSA-1 and the $TiOCl_2$ method described in Example 2 and then further treated with a mixture of $NH_4H_2PO_4$ and $H_3PO_4$ and boiled. A synthetic feed containing 0.5 g $U_3O_8$ per liter was pumped through the resin. A sample between 6 and 7 liters of effluent was found to contain 0.076 g $U_3O_8$/liter. Between 7-8 liters was 0.106 g/l and between 8.05-8.45 liters was found 0.168 g $U_3O_8$/l.

We claim:

1. A resin composite comprising macroporous particles of ion exchange resin having post-deposited therein at least one hydrous metal oxide selected from the group comprising titania hydrate, zirconia hydrate, hydrated titanium phosphate, and hydrated zirconium phosphate.

2. The resin composite of claim 1 wherein the resin is a cation exchange resin.

3. The resin composite of claim 1 wherein the rresin is an anion exchange resin.

4. The resin composite of claim 1 wherein the resin is a crosslinked copolymer of styrene and divinylbenzene having pendent sulfonic acid functional groups or amine functional groups.

5. A method for preparing a resin composite, said composite comprising macroporous particles of ion exchange resin having post-deposited therein at least one hydrous metal oxide selected from the group comprising titania hydrate, zirconia hydrate, hydrated titanium phosphate, and hydrated zirconium phosphate, said method comprising
mixing with said resin an aqueous solution of the requisite compound or compounds of titanium and/or zirconium,
adding an alkalizing agent to said aqueous solution thereby precipitating said requisite compound or compounds as metal oxide hydrates,
washing out excess alkalizing agent and any soluble alkali compounds which are formed, and optionally, reacting said metal oxide hydrates with soluble phosphate values.

6. The method of claim 5 wherein the requisite titanium compound is at least one soluble titanium compound which will form a titania hydrate when alkalized.

7. The method of claim 5 wherein the requisite zirconium compound is at least one soluble zirconium compound which will form a zirconia hydrate when alkalized.

8. The method of claim 5 wherein the optional phosphorous compound to be reacted with the said metal oxide hydrate is at least one selected from the group comprising $H_3PO_4$, $NaH_2PO_4$, $Na_2HPO_4$, $KH_2PO_4$, $K_2HPO_4$, $NH_4H_2PO_4$, and $(NH_4)_2HPO_4$.

9. The method of claim 5 wherein the alkalizing agent is selected from the group comprising ammonia, alkali metal hydroxide, alkali metal carbonate, alkali metal acetate, and organic amine.

10. The method of claim 5 wherein the alkalizing agent is ammonia.

11. The method of claim 5 wherein the resin is a cation exchange resin.

12. The method of claim 5 wherein the resin is an anion exchange resin.

13. The method of claim 5 wherein the resin is a crosslinked copolymer of styrene and divinylbenzene having pendent sulfonic acid functional groups.

14. The method of claim 5 wherein the resin is a crosslinked copolymer of styrene and divinylbenzene having pendent amine functional groups.

15. A method of removing uranium values from an aqueous solution, said method comprising
intimately contacting said aqueous solution with an ion exchange resin and removing uranium-depleted solution from said resin,
wherein said resin comprises a macroporous ion exchange resin having incorporated therein at least one hydrous metal oxide selected from the group comprising titania hydrate, zirconia hydrate, hydrated titanium phosphate and hydrated zirconium phosphate.

* * * * *